Patented Aug. 6, 1929.

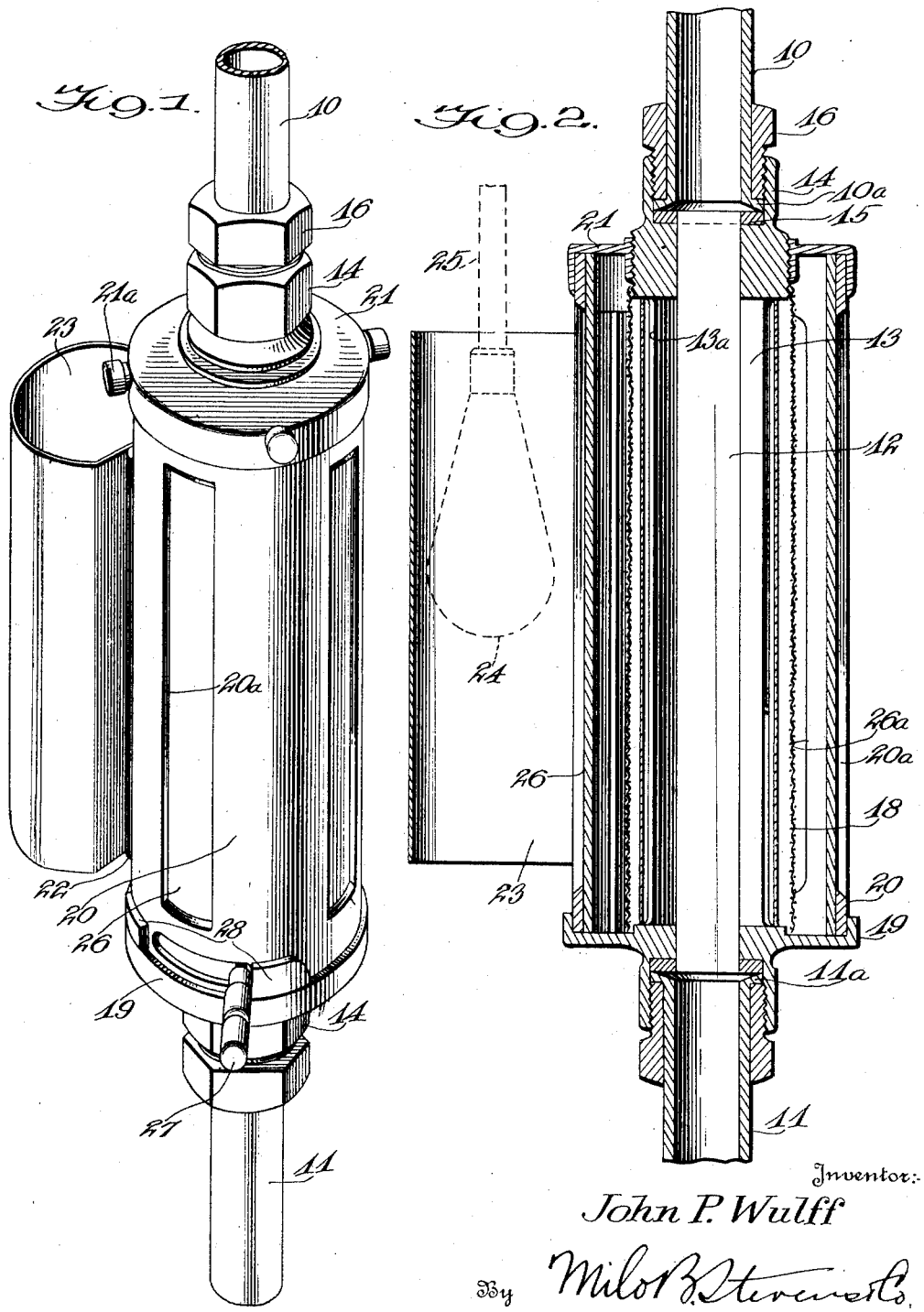

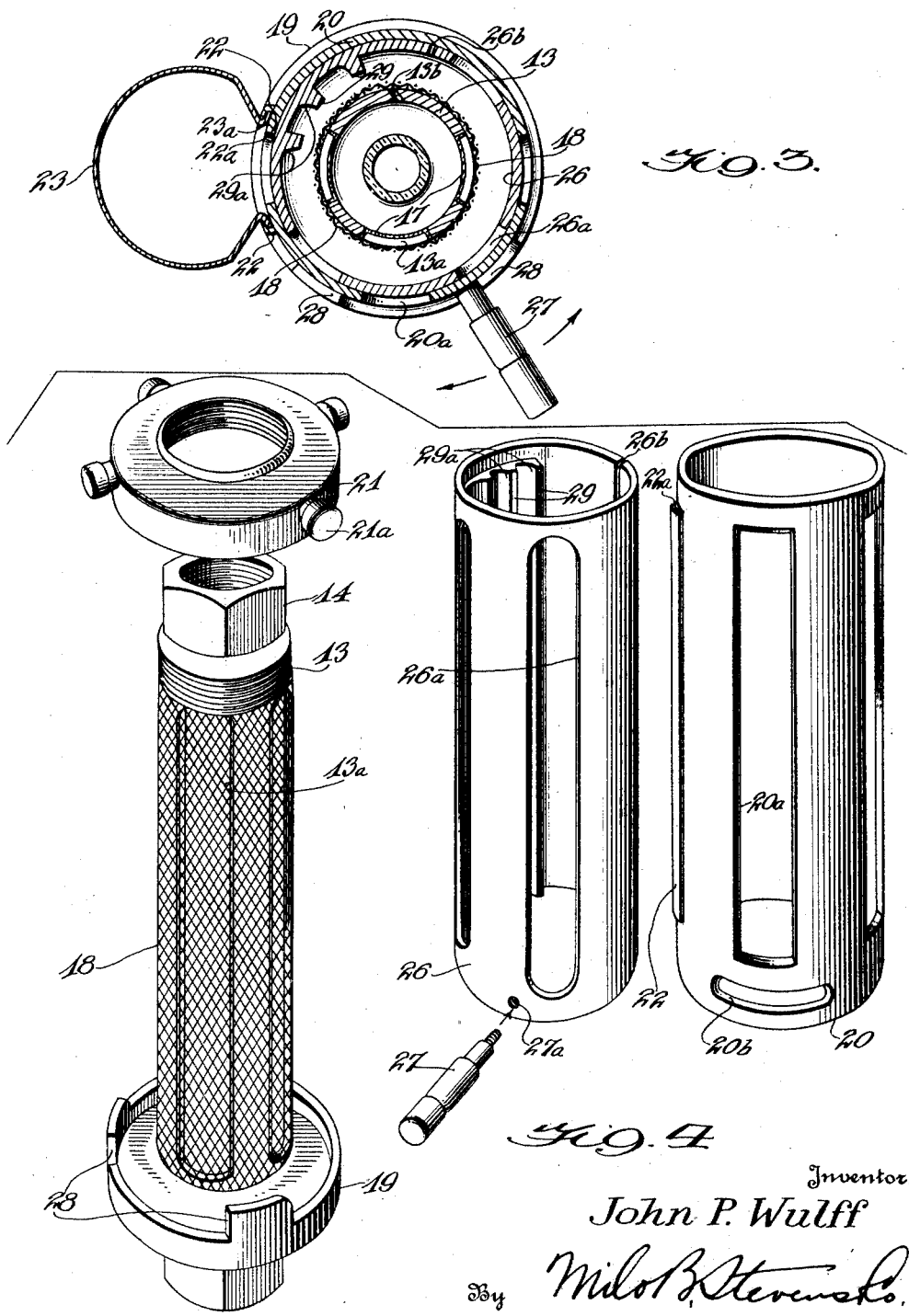

1,723,454

UNITED STATES PATENT OFFICE.

JOHN P. WULFF, OF CHICAGO, ILLINOIS.

WATER-GLASS GUARD.

Application filed June 6, 1927. Serial No. 196,991.

This invention relates to water glass equipment for stationary and locomotive boilers, and more particularly to devices for shielding the glass against the effects of breakage from excess heat, and my main object is to provide a novel appliance for this purpose which constitutes a perfect guard.

A further object of the invention is to so construct the appliance that persons and objects in the vicinity of the water glass will not be in danger of scalding from steam or hot water, or injury from flying glass in the event of the bursting of the water glass.

A still further object of the invention is to have the same operate automatically, requiring no assistance whatever to attain complete safety.

Another object of the invention is to so design the automatic feature of the appliance as to act instantaneously in the event of an emergency.

A final but nevertheless important object of the invention is to construct the device of few and simple parts, in order that its installation may be easily and quickly effected and its cost of production reasonable.

With the objects in view and any others that may suggest themselves in the specification and claims to follow, a better understanding of the invention may be gained by reference to the accompanying drawing, in which—

Figure 1 is a perspective view of the novel appliance;

Fig. 2 is a vertical section thereof;

Fig. 3 is a horizontal section; and

Fig. 4 is a group perspective view of the main parts of the appliance.

The problem of breakage in water glasses from overheating is one of no little concern to firemen, engineers or other persons frequently in the vicinity of the water glass while attending to the boiler. As the contents of the water glass are under pressure, the bursting of the glass is usually accompanied by the emission of steam and water in various directions and the flying of pieces of glass from the area of the rupture. Persons and objects in the vicinity of the water glass are therefore subject to injury of a serious nature, and a guard to confine the effects of the occurrence to close limits would therefore be a highly desirable article.

My invention accomplishes the objects contemplated above by a unique arrangement of parts whose nature and operation will now be described.

Standard equipment for the water glass of a boiler includes an upper pipe 10 leading from the steam chamber of the boiler and a lower pipe 11 leading from the water body therein. These pipes are provided with hand-controlled valves—not shown—to cut off the flow from the boiler when desired, and receive between them the water glass 12. The latter is housed in a tube 13 having terminal tapped receptacles 14 for the respective pipes 10 and 11 and the water glass. In fitting the pipes into the receptacles 14, a packing washer 15 is first laid. Then the flanged inner ends $10^a$ and $11^a$ of the pipes are pressed in to seal the joint by a securing nut 16 threaded into the receptacle.

The tube 13 is of open construction, having its walls formed with a series of laterally grouped openings $13^a$. The wall is also cut on the side opposite the group of openings with a narrow vertical slot $13^b$ whose edges are parallel and inclined to an axial plane passing through them. The openings $13^a$ are fitted with strips 17 of transparent celluloid or mica, but the slot $13^b$ is left open, to serve a purpose presently to be made clear. About this assembly is snugly fitted a tube 18 of wire netting.

The tube 13 is formed near its lower end with a flanged receptacle 19 for a cylindrical shell 20, and near its upper end the tube is threaded to receive a screw-cap 21 with finger-knobs $21^a$ to clamp the shell firmly to the assembly of the tube 13. Like the latter, the shell is cut with a series of spaced openings $20^a$, these registering in number and position with the openings $13^a$ and being approximately of the same size.

With the appliance installed, it will be seen that one may, by looking through any of the openings $20^a$, ascertain the level of the water in the water glass. Thus, where the appliance is installed in a locomotive cab and is positioned, as is the custom, near the left-hand window (looking forward) the light from that direction will enter through the opening $20^a$ on the corresponding side of the shell, so that the fireman or the engineer may from their respective stations view the water glass through that one of the remaining openings $20^a$ facing the particular station. In case daylight is not readily available, such as when the locomotive is used for night runs or the appliance is installed on a boiler in a poorly lighted location, I provide a simple expedient for illuminating the water glass as follows: Alongside the remote opening or window 20ª the shell is formed with two ribs 22, whose contiguous edges are undercut or channelled as indicated at 22ª to receive the ear-shaped lateral edges 23ª of a bowed-plate 23 of spring sheet metal. The plate is compressed when fitted to the shell, and its expansive tendency holds it firmly thereto. Within the plate an electric lamp 24, depending from a suitable fixture 25, may be arranged, so that the interior of the shell is illuminated through the window opening 20ª, and the water glass is therefore clearly visible.

The feature of the invention, dealing with its factor of safety will now be taken up. Next inside the shell 20 is a hollow cylindrical liner 26 therefor with open ends and of a size to fill the shell except for a slight amount of body and end clearance, whereby the liner may be freely rotated in one or the other direction relative to the shell, notwithstanding normal expansion tendencies such as induced by heat. The walls of the liner are cut with a series of openings 26ª similar in position and size to the openings 20ª and adapted to register with the latter when the liner is in normal position, so that the illumination and view of the water glass—treated in a foregoing section—are not ordinarily obstructed. However, when the liner is given a sufficient rotative movement, its walls assume positions opposite the shell openings 20ª, closing the latter like a shutter. The movement of the liner may be controlled by a small handle 27 which is passed through a horizontal slot 20ᵇ in the shell and threaded into the liner near its lower end, as shown at 27ª. The slot 20ᵇ is of a length suitable for the proper shutter-action of the liner, and it is positioned—when the shell is fitted—to span the space between two limiting lugs 28 formed from the flange of the lower shell receptacle 19, so that these lugs also assist as visible terminals for the handle 27, in that their position relative to that of the slot 20ᵇ indicates that the shell and the assembly of the tube 13 are in proper radial alinement.

The radial alinement of the shell 20 with the assembly of the tube 13, just mentioned, is an indispensable factor when the automatic operation of the liner 26 is anticipated. Thus, when the liner is in normal or retracted position, and its openings 13ª register with the openings 20ª of the shell, the slot 13ᵇ of the central tube 13 is directed opposite a series of pockets 29ª formed in vertical ribs 29 along the inner wall of the liner. The arrangement of the slot 13ᵇ and the recessed ribs 29 is such that should pressure be emitted from the slot in the direction of the ribs, the latter will act as the blades or buckets of a turbine, causing the liner to turn to shutting position relative to the shell. Accordingly, should the water glass break the steam and water issuing through the slot 13ᵇ under pressure will bear on the liner in the manner outlined whereby to close the shell and become confined therein. This action, when the emergency develops, is so quick that the steam and hot water have no opportunity to escape and injure persons or objects in the vicinity of the water glass. To insure a complete closure, the liner is split vertically at one point, as indicated at 26ᵇ, in order that an accumulation of pressure within it may expand it to seat firmly in the shell walls and completely seal the same.

The celluloid or mica strips 17, as fitted in the openings 13ª of the tube 13, are intended not only as windows, but also to momentarily check the issue of steam or water jets when the water glass inside breaks, so that the tube 13 may fill and discharge through the slot 13ᵇ as previously described. However, should a window strip 17 suffer a break or split by force of a sharp piece of the glass, the wire netting tube or envelope 18 will prevent such piece of glass from progress to an extent of interference with the summary closing of the liner 26.

It will be seen that a simple and sturdy device is had, which is instantaneous and automatic in its action. It has not springs, levers or other parts of a nature to fail when an emergency develops, and once installed, may be considered as the solution of a safety problem which has always caused more or less apprehension to those in charge of boilers.

I claim:

1. In combination with a water glass, a water glass guard comprising a housing having a plurality of apertures and completely enclosing the glass, and a single shutter to close the perforations of the housing, and means whereby said shutter may be actuated by the pressure of the escaping contents of the water glass in case of breakage to close the perforations.

2. In combination with a water glass, a water glass guard comprising a perforated cylindrical housing enclosing the glass, a cylindrical shutter snugly fitted within the housing and adapted to close the perforations of the housing, and a pressure-actuated means on the shutter for closing the same.

3. In combination with a water glass, a water glass guard comprising a perforated cylindrical housing about the glass, a shutter rotatable on the axis of the housing to close the perforations of the housing, and means actuated by pressure of the escaping contents of the water glass in case of breakage of the water glass for closing the shutter.

4. A water glass guard comprising a perforated housing about the glass, a shutter inside the housing and adapted to close the perforations thereof, said shutter having pockets, and an intimate enclosure for the glass having an outlet passage positioned to discharge toward said pockets and induce the closing of the shutter.

5. A water glass guard comprising a perforated housing about the glass, a shutter inside the housing and adapted to close the perforations thereof, vanes projecting from the shutter, and an intimate enclosure for the glass having an outlet passage positioned to discharge toward said vanes and induce the closing of the shutter.

6. In combination with a water glass, a water glass guard comprising a perforated tubular housing about the glass, and a rotatable tubular shutter concentric with the housing adapted to automatically close the housing in the event of the bursting of the water glass.

7. In combination with a water glass, a water glass guard comprising a tubular housing about the glass and having perforated tubular walls, and a perforated shutter lining the latter and adapted to close the said walls, said shutter being longitudinally split whereby to expand when influenced by pressure and firmly seat in said walls.

8. A water glass guard comprising a cylindrical housing about the glass and having perforations, a shutter next inside the housing wall and perforated to register with the housing perforations when the shutter is open, and means to rotate the shutter upon the bursting of the water glass whereby to close the housing.

9. A water glass guard comprising a cylindrical housing about the glass and having perforations, a shutter next inside the housing wall and perforated to register with the housing perforations when the shutter is open, and manual means to rotate the shutter whereby to close and open the housing.

In testimony whereof I affix my signature.

JOHN P. WULFF.